(12) United States Patent
Takagi et al.

(10) Patent No.: US 9,979,258 B2
(45) Date of Patent: May 22, 2018

(54) VIBRATION MOTOR

(71) Applicant: Nidec Seimitsu Corporation, Ueda-shi, Nagano-ken (JP)

(72) Inventors: Daisuke Takagi, Ueda (JP); Naoki Kanai, Ueda (JP)

(73) Assignee: NIDEC SEIMITSU CORPORATION, Nagano-ken (JP)

( * ) Notice: Subject to any disclaimer, the term of this patent is extended or adjusted under 35 U.S.C. 154(b) by 385 days.

(21) Appl. No.: 14/945,604

(22) Filed: Nov. 19, 2015

(65) Prior Publication Data

US 2016/0141935 A1 May 19, 2016

(30) Foreign Application Priority Data

Nov. 19, 2014 (JP) .................... 2014-234779

(51) Int. Cl.
*H02K 7/06* (2006.01)
*H02K 7/08* (2006.01)
*H02K 3/28* (2006.01)

(52) U.S. Cl.
CPC ............. *H02K 7/085* (2013.01); *H02K 7/061* (2013.01)

(58) Field of Classification Search
CPC .......... H02K 7/085; H02K 3/28; H02K 7/061; H02K 7/063
USPC .......................................................... 310/81
See application file for complete search history.

(56) References Cited

U.S. PATENT DOCUMENTS

| 8,378,539 B2 * | 2/2013 | Kanai | ........................ B06B 1/16 310/40 MM |
|---|---|---|---|
| 9,093,870 B2 | 7/2015 | Kanai | |
| 2004/0084980 A1 * | 5/2004 | Yamaguchi | ............ H02K 7/063 310/81 |
| 2004/0256930 A1 * | 12/2004 | Kim | ........................ H02K 7/063 310/81 |
| 2004/0256931 A1 * | 12/2004 | Choi | .................... H02K 5/1677 310/81 |
| 2007/0040462 A1 | 2/2007 | Yamaguchi | |

(Continued)

FOREIGN PATENT DOCUMENTS

| CN | 103141013 A | 6/2013 |
|---|---|---|
| JP | 2006-094643 A | 4/2006 |
| JP | 2008-289268 A | 11/2008 |

*Primary Examiner* — Alex W Mok
(74) *Attorney, Agent, or Firm* — Keating & Bennett, LLP

(57) ABSTRACT

A vibration motor, comprising a base part which expands perpendicular to a vertical center axis; a shaft which protrudes upward along the center axis, a lower end of the shaft being coupled to the base part; a circuit board disposed on the base part; coil parts which are attached onto the circuit board, and face each other in a radial direction across the shaft and a gap; a bearing part which is rotatably attached to the shaft at an upper side than the coil parts; a rotor holder which is attached to the bearing part; a magnet part which is attached to the rotor holder; an eccentric weight which is attached to the rotor holder; a spacer which is attached to the shaft at a portion between the bearing part and the coil part, a top surface of the spacer being in contact with a bottom surface of the bearing part; and a cover part which covers at least a portion of the upper and lateral sides of the rotor holder and the eccentric weight, and is fixed to an upper end portion of the shaft and an edge portion of the base part, wherein a bottom surface of the spacer vertically faces a top surface of the coil part.

17 Claims, 16 Drawing Sheets

(56) References Cited

U.S. PATENT DOCUMENTS

| | | | |
|---|---|---|---|
| 2008/0246356 A1* | 10/2008 | Park, II | H02K 7/063 310/81 |
| 2009/0230797 A1* | 9/2009 | Park | H02K 5/1677 310/81 |
| 2015/0236563 A1* | 8/2015 | Yamaguchi | H02K 7/063 310/81 |
| 2015/0288248 A1* | 10/2015 | Yamaguchi | H02K 1/2793 310/81 |

* cited by examiner

VIBRATION MOTOR

BACKGROUND OF THE INVENTION

1. Field of the Invention

The present disclosure relates to a vibration motor.

2. Description of the Related Art

From the past, a brushless vibration motor of a thin coin type has been used for a silent notification device of mobile communication devices and the like, or for other purposes. In this vibration motor, a spacer is provided around a shaft on a base part to which the shaft is fixed, as disclosed in Japanese Patent Application Publication No. 2008-289268 and Japanese Patent Application Publication No. 2006-94643, etc. A lower end portion of a rotating part, which is rotatably attached to the shaft, is in contact with the spacer. A coil part is also provided around the spacer.

For example, in Japanese Patent Application Publication No. 2008-289268, an eccentric rotor R is rotatably mounted on an axis 2 through a thrust washer SW and a bearing 9. The axis 2 is fixed to a bracket 1, and the thrust washer SW is attached to the axis 2 on the bracket 1. Four air-core armature coils 5 are securely mounted on the bracket 1 at a radially outer side of the axis 2 and the thrust washer SW.

In Japanese Patent Application Publication No. 2006-94643, a sleeve metal 14, which is press-fitted to a center portion of a rotor yoke 13, is fitted to a shaft 6. A washer 16 is fitted to the shaft 6 at a portion between a base member 3 and the sleeve metal 14. With this, the rotor yoke 13 can be rotatably supported on the base member 3. Further, two coils 8, which are facing each other across the shaft 6 and the washer 16, are mounted on a circuit board 7 which is fixed onto the base member 3.

In recent years, a further minimization for a coin type vibration motor has been required in accordance with the minimization of mobile communication devices, etc. However, if the diameter of the motor is simply reduced, the volume of the coil part should be reduced, and thereby motor torque will be reduced and consequently the amount of vibration will also be reduced. Otherwise, the amount of vibration will be reduced by the decreased volume of an eccentric weight.

SUMMARY OF THE INVENTION

A first exemplary preferred embodiment of the present disclosure is a vibration motor, which comprises a base part which expands perpendicular to a vertical center axis, a shaft which protrudes upwardly along the center axis, with its lower end fixed to the base part, a circuit board disposed on the base part, coil parts which are attached onto the circuit board, and face each other in a radial direction across the shaft and a gap, a bearing part which is rotatably attached to the shaft at an upper side than the coil parts, a rotor holder which is attached to the bearing part, a magnet part which is attached to the rotor holder, an eccentric weight which is attached to the rotor holder, a spacer which is attached to the shaft at a portion between the bearing part and the coil part, with its top surface in contact with a bottom surface of the bearing part, and a cover part which at least partially covers the upper and lateral sides of the rotor holder and the eccentric weight, and is fixed to an upper end portion of the shaft and an edge portion of the base part, wherein a bottom surface of the spacer vertically faces a top surface of the coil part.

In the present disclosure, it is possible to suppress the reduction of the amount of vibration, and radially minimize the size of the vibration motor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a vertical cross-sectional view of a vibration motor according to a third preferred embodiment.

FIG. 12 is a perspective view of the rotary unit and the stationary unit.

DETAILED DESCRIPTION OF THE PREFERRED EMBODIMENTS

Figure 2:
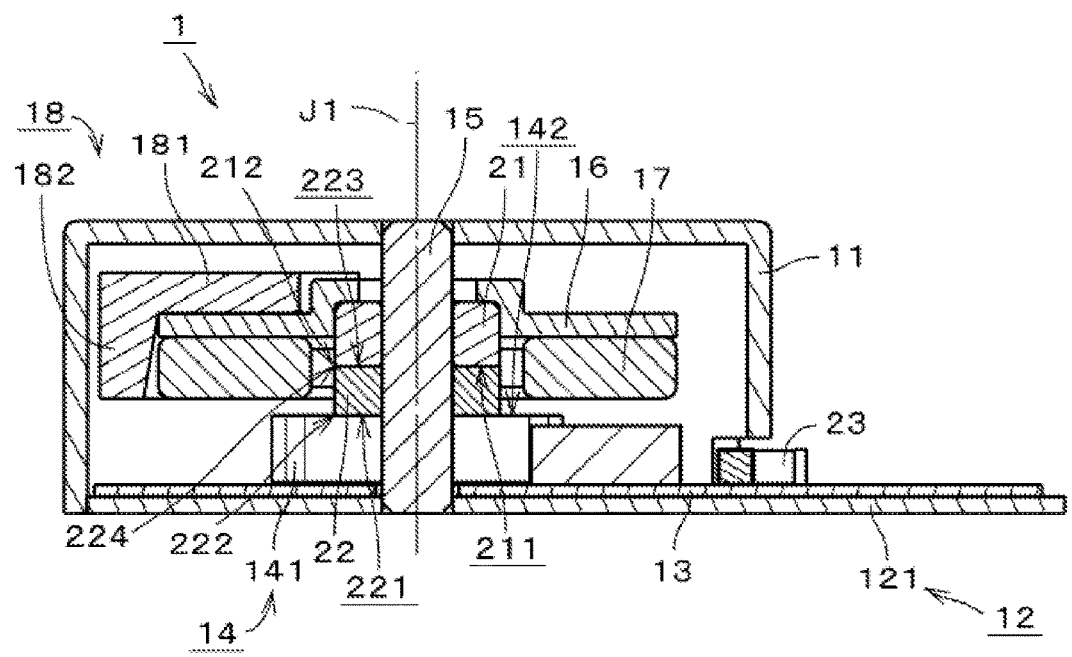
FIG. 2 is a vertical cross-sectional view of the vibration motor.

Herein, the upper side of FIG. 2 in the center axis J1 direction of the vibration motor 1 is simply referred to as "upper side" and the lower side thereof is referred to as "lower side." However, it will be understood that this definition of the upper and lower sides is not intended to limit the positional relations or directions when the vibration motor is actually assembled and installed to any equipment. Further, a direction parallel to the center axis J1 is referred to as "vertical direction." A radial direction having its center on the center axis J1 is simply referred to as "radial direction," and a circumferential direction having its center on the center axis J1 is simply referred to as "circumferential direction."

Figure 1:
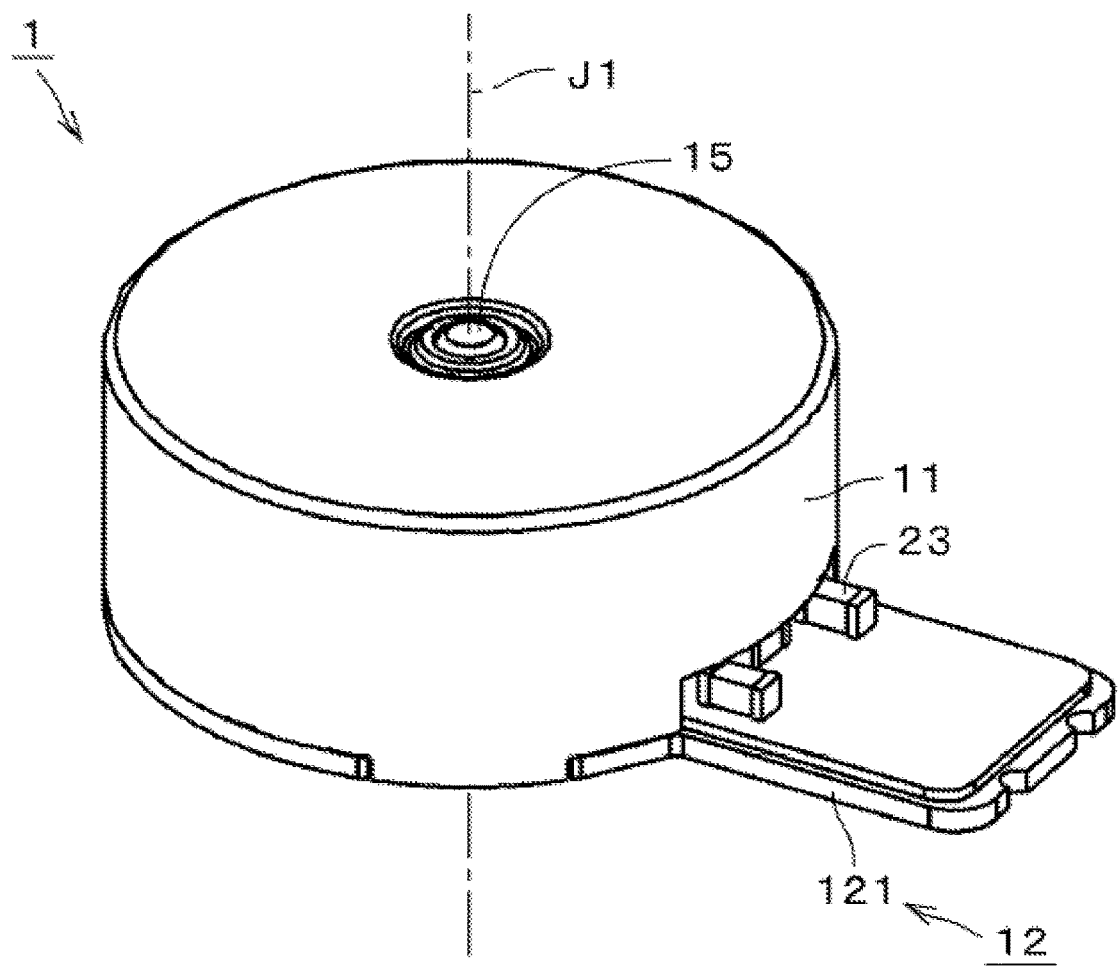
FIG. 1 is a perspective view of a vibration motor according to a first preferred embodiment.
Figure 3:
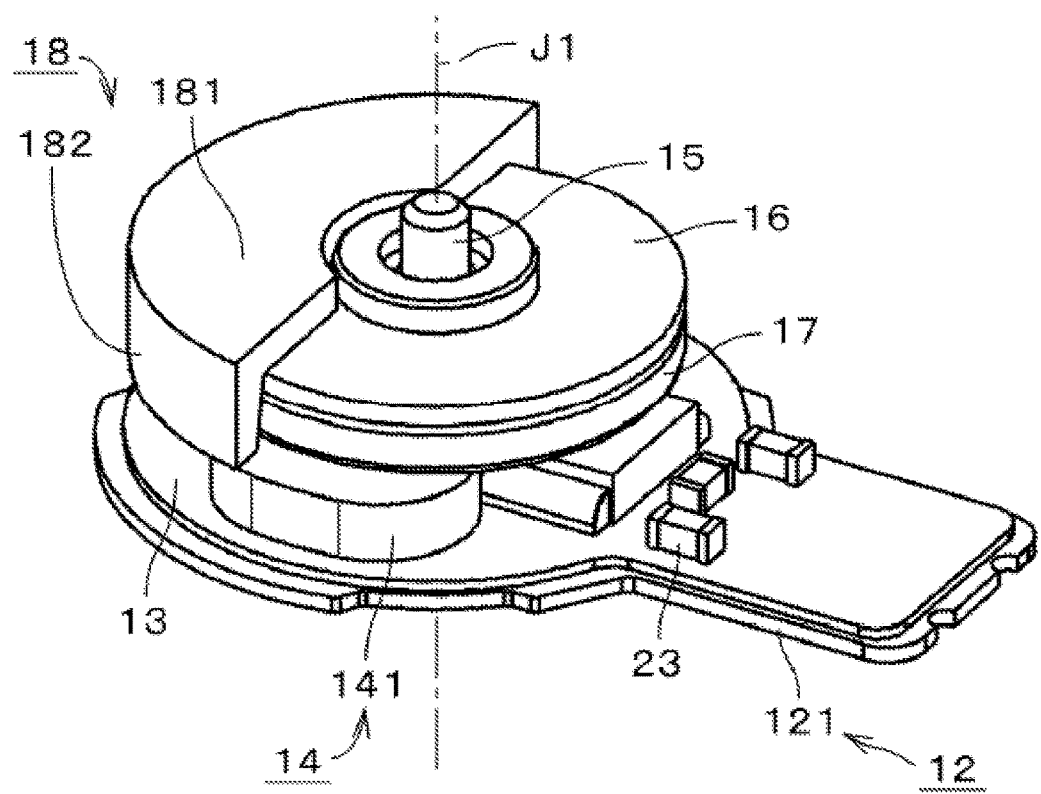
FIG. 3 is a perspective view of a rotary unit and a stationary unit of the vibration motor.
Figure 4:
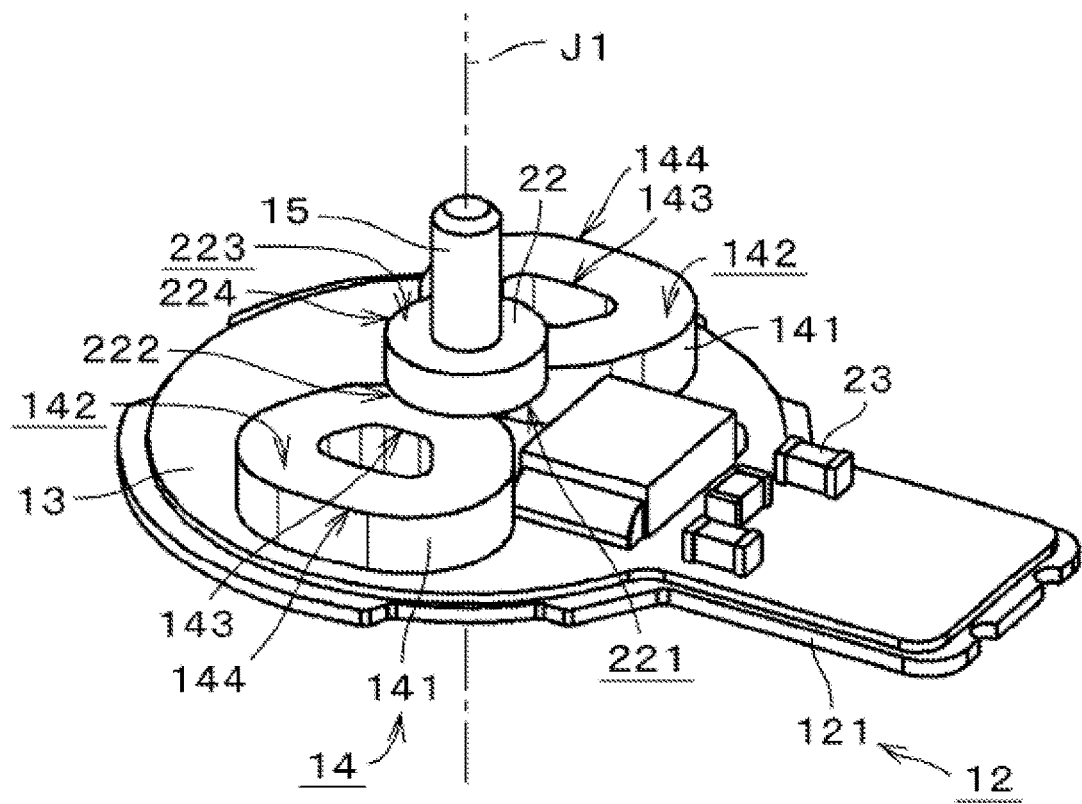
FIG. 4 is a perspective view of the stationary unit.
Figure 5:
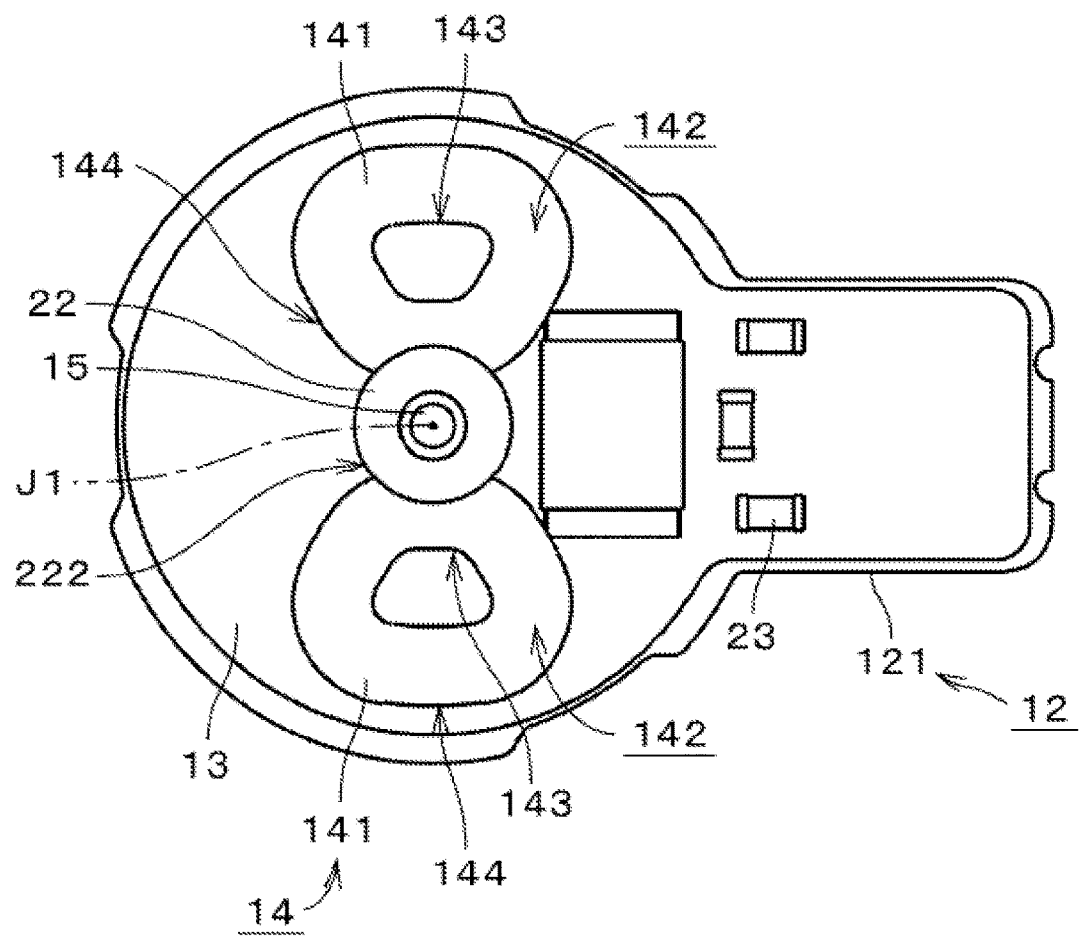
FIG. 5 is a top view of the stationary unit.
Figure 6:
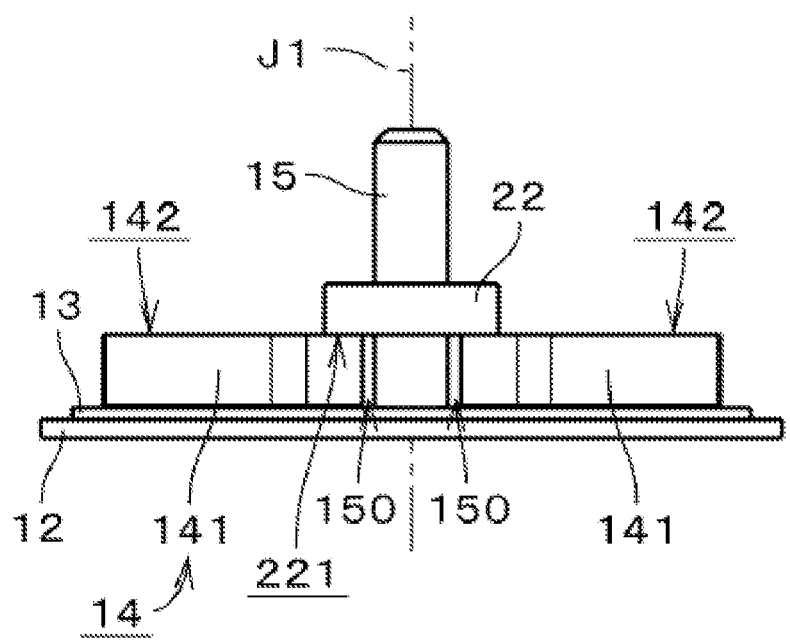
FIG. 6 is a side view of the stationary unit.

FIG. 1 is a perspective view which illustrates the exterior of a vibration motor 1 according to a first exemplary preferred embodiment of the present disclosure. FIG. 2 is a vertical cross-sectional view of the vibration motor 1. In FIG. 2, a parallel diagonal line is omitted from the cross section details. FIG. 2 also illustrates the features of the far back side, rather than illustrating just the cross section. FIG. 3 is a perspective view of a rotary unit and a stationary unit of the vibration motor 1. FIG. 4 is a perspective view of the stationary unit of the vibration motor 1. FIG. 5 is a top view of the stationary unit of the vibration motor 1. FIG. 6 is a side view of the stationary unit of the vibration motor 1. FIG. 6 illustrates the stationary unit of the vibration motor 1 when viewed from the left side of FIG. 5.

The vibration motor 1 may be used as a silent notification device in mobile communication equipments, for example, such as a cellular phone, etc.

The vibration motor 1 includes a cover part 11 and a base part 12. The cover part 11 has a substantially cylindrical shape with a lid. The base part 12 expands perpendicular to a vertical center axis J1. The cover part 11 is coupled to an edge portion of the base part 12. The base part 12 closes an opening at a lower side of the cover part 11. The cover part 11 and the base part 12 are made of, for example, metal. The cover part 11 and the base part 12 are connected by, for example, welding. The base part 12 includes a base protrusion 121 which extends substantially perpendicular to the center axis J1. The base protrusion 121 protrudes outward from the cover part 11 to a radially outer side.

The vibration motor 1 also includes a circuit board 13, a coil part 14, a shaft 15, a rotor holder 16, a magnet part 17, and an eccentric weight 18. The vibration motor 1 further includes a bearing part 21 and a spacer 22. The base part 12, the circuit board 13, the coil part 14, the shaft 15 and the spacer 22 are included in a stationary unit. The bearing part 21, the rotor holder 16, the magnet part 17 and the eccentric weight 18 are included in a rotary unit. FIG. 3 illustrates the vibration motor 1 without the cover part 11. FIG. 4 to FIG. 6 illustrate the vibration motor 1 without the cover part 11 and the rotary unit.

The circuit board 13 is disposed on the base part 12. The circuit board 13 is adhered to the base part 12 by using an adhesive. Also, in this preferred embodiment, the concept of an adhesive includes a double-sided adhesive tape or other gluing agents, etc. The circuit board 13 is a Flexible Printed Circuits (FPC), which has flexibility. An electronic component 23 is mounted on the circuit board 13.

The coil part 14 may be attached on the circuit board 13. The coil part is electrically connected to the circuit board 13. The coil part 14 includes a plurality of coils 141. The plurality of coils 141 are disposed around the shaft 15. In the examples shown in FIG. 4 to FIG. 6, the coil part 14 includes two coils 141. The two coils 141 are disposed opposite from each other across the shaft 15. The number of coils 141 included in the coil part 14 may be three or more. Each coil 141 is adhered onto the circuit board 13 by using an adhesive. In the example shown in FIG. 4, each coil 141 surrounds an axis parallel to the shaft 15 when seen in a top view, and has a ring shape with the shaft 15 disposed at an outer side thereof.

The shaft 15 is disposed to have its center on the center axis J1. The lower end side of the shaft 15 is fixed to the base part 12. The shaft 15 protrudes upward along the center axis J1 from the base part 12. The upper end side of the shaft 15 is fixed to the center portion of the lid part of the cover part 11. The shaft 15 is fixed to the base part 12 and the cover part 11 by, for example, welding or press-fitting. The shaft 15 faces each of the plurality of coils 141 in the radial direction with a gap 150 shown in FIG. 6. That is, the coil parts 14 face each other across the shaft 15 and the gap 150 in the radial direction. None of the members that constitute the vibration motor 1 may be disposed at the gap 150. The shaft 15 is made of, for example, metal. The shaft 15 may be made of other materials.

The spacer 22 is an annular member having a through hole at the center portion. In the example shown in FIG. 4 to FIG. 6, the spacer 22 has an annular ring shape. Specifically, the spacer has a substantially cylindrical shape having its center on the center axis J1. The shaft 15 is inserted through the through hole of the spacer 22. The spacer 22 may be attached to the shaft 15 by, for example, press-fitting. The spacer 22 is disposed at an upper side than the coil part 14, and fixed to the shaft 15. The spacer 22 is formed of, for example, a resin. The spacer 22 may be formed of other materials. Also, the spacer 22 may be attached to the shaft 15 by using any methods other than press-fitting.

A bottom surface 221 of the spacer 22 vertically faces an upper surface of the coil part 14. In the example shown in FIG. 4 and FIG. 6, the bottom surface 221 of the spacer 22 is in contact with the upper surface of the coil part 14. Specifically, the bottom surface 221 of the spacer 22 is in contact with the respective upper surface 142 of the two coils 141. As shown in FIG. 4 and FIG. 5, the entire inner circumferential edge 143 of the top surface 142 of each coil 141 is disposed on a radially outer side than an outer edge 222 of the bottom surface 221 of the spacer 22. A portion of an outer circumference 144 of the upper surface 142 of each coil 141 is disposed at a radially inner side than the outer edge 222 of the bottom surface 221 of the spacer 22. That is, the bottom surface 221 of the spacer 22 partially overlaps with the top surface 142 of each coil 141, but does not overlap with an opening provided at the center portion of the top surface 142.

The bearing part 21 is an annular member having a through hole at the center portion. In the example shown in FIG. 2, the bearing part 21 has an annular ring shape. Specifically, the bearing part 21 has a substantially cylindrical shape having its center on the center axis J1. The shaft 15 is inserted through the through hole of the bearing part 21. The bearing part 21 may be rotatably attached to the shaft 15 at an upper side than the coil part 14. The bearing part 21 is also disposed at an upper side than the spacer 22. That is, the spacer 22 can be attached to a portion between the bearing part 21 and the coil part 15.

As shown in FIG. 2, a top surface 223 of the spacer 22 is in contact with a bottom surface 211 of the bearing part 21. In the example shown in FIG. 2, an outer edge 224 of the top surface 223 of the spacer 22 overlaps with an outer edge 212 of the bottom surface 211 of the bearing part 21 over the entire circumference. That is, the outer diameter of the top surface 223 of the spacer 22 is substantially the same as the outer diameter of the bottom surface 211 of the bearing part 21. The bearing part 21 is a sliding bearing. The bearing part 21 may be a different type of bearing. The bearing part 21 is formed of, for example, a sintered metal. Preferably, the bearing part 21 is impregnated with lubricating oil. The bearing part 21 may be formed of other materials.

The rotor holder 16 is a member having a substantially annular shape. The rotor holder 16 may be attached to the bearing part 21. Specifically, an inner circumferential portion of the rotor holder 16, which has a substantially annular plate shape, is fixed to a top surface and an upper side of an outer circumferential surface of the bearing part 21. For this reason, the rotor holder 16 is rotatably supported on the shaft 15 by the bearing part 21. The rotor holder 16 is made of, for example, metal.

The magnet part 17 is a substantially annular member having its center on the center axis J1. The magnet part 17 may be attached to the rotor holder 16. Specifically, a top surface of the magnet part 17, which has a substantially cylindrical shape, can be attached to a bottom surface of the rotor holder 16. The magnet part 17 is disposed over the coil part 14, and faces the coil part 14 in the vertical direction with a gap. The magnet part 17 is disposed around the bearing part 21 and the spacer 22. The bearing part 21 is disposed at a radially inner side of the magnet part 17, and radially faces the magnet part 17 with a gap. The spacer 22 is disposed at a radially inner side of the magnet part 17.

That is, the top surface 223 of the spacer 22 is disposed at an upper side than the bottom surface of the magnet part 17. The spacer 22 radially faces the magnet part 27 with a gap.

In the example shown in FIG. 2 and FIG. 3, the eccentric weight 18 has a shape that corresponds to a left half of a substantially cylindrical member with a lid. The eccentric weight 18 has a substantially semicircular shape when seen in a top view. The eccentric weight 18 may be attached to the rotor holder 16. Specifically, a bottom surface of the lid portion 181 of the eccentric weight 18 can be attached to the top surface of the rotor holder 16 by using, for example, an adhesive. A side wall portion 182 of the eccentric weight 18 partially covers a side portion of the rotor holder 16 and the magnet part 17. A lower end of the side wall portion 182 of the eccentric weight 18 is disposed at substantially the same position in the vertical direction with a lower end of the magnet part 17. The center of gravity of the eccentric weight 18 is radially spaced away from the center axis J1.

The cover part 11 covers the upper and side portions of the rotor holder 16 and the eccentric weight 18. The cover part 11 does not necessarily need to cover the entire rotor holder 16 and the eccentric weight, and it may be provided with an opening or the like thereby covering at least a portion of the rotor holder 16 and the eccentric weight 18. As described above, the cover part 11 is fixed to the upper end of the shaft 15, and simultaneously fixed to the edge portion of the base part 12.

In the vibration motor 1, electric current is supplied to the coil part 14 through the circuit board 13, and thereby torque is generated between the coil part 14 and the magnet part 17. Accordingly, the bearing part 21, the rotor holder 16, the magnet part 17 and the eccentric weight 18 rotate about the shaft 15. As described above, since the center of gravity of the eccentric weight 18 is radially spaced away from the center axis J1, vibration is generated by the rotation of the eccentric weight 18.

As described above, in the vibration motor 1, the spacer 22 may be attached to the shaft 15 at a portion between the bearing part 21 and the coil part 14. The coil parts 14 radially face each other across the shaft 15 and the gap 150. The top surface 223 of the spacer 22 is in contact with the bottom surface 211 of the bearing part 21. Also, the bottom surface 221 of the spacer 22 vertically faces the top surface 142 of the coil part 14.

For this reason, when compared to a vibration motor having a spacer arranged in a radially inner side of a coil part (hereinafter, referred to as "vibration motor of a comparative example"), the vibration motor 1 is capable of disposing the coil part proximate to the shaft 15 in the radial direction. Accordingly, the vibration motor 1 can be radially minimized, while suppressing the reduction of the amount of vibration by suppressing the decrease in volume of the coil part 14 and the eccentric weight 18. Also, in case the vibration motor 1 is not so much minimized, the amount of vibration can be increased by enlarging the coil part 14 and/or the eccentric weight 18 and thereby increasing the torque.

As described above, the bottom surface 221 of the spacer 22 is in contact with the top surface 142 of the coil part 14. Accordingly, the vibration motor 1 can be vertically minimized. Also, since the vertical movement of the coil part 14 is limited, the coil part 14 can be inhibited from being peeled off from the circuit board 13 when the vibration motor 1 falls or in other situations. Further, since the vertical location of the top surface 142 of the coil part 14 can be inhibited from being unevenly arranged, the vertical distance between the coil part 14 and the magnet part 17, that is, the gap between the coil part 14 and the magnet part 17 can be easily secured.

As described above, the spacer 22 can be attached to the shaft 15 by press-fitting. For this reason, the spacer 22 can be securely fixed to the shaft 15. As a result, the coil part 14 can be further inhibited from being peeled off from the circuit board 13 when the vibration motor 1 falls or in other situations. Further, the vertical distance between the coil part 14 and the magnet part 17 also can be easily provided.

In the vibration motor 1, the spacer 22 has an annular shape. By thus simplifying the shape of the spacer 22, the spacer 22 can be easily manufactured. Also, the spacer 22 is disposed at a radially inner side of the magnet part 17. For this reason, when compared to a case in which the magnet part is disposed at an upper side than the spacer, the vibration motor 1 can be vertically minimized.

As described above, the outer edge 224 of the top surface 223 of the spacer 22 overlaps in its entire circumference with the outer edge 212 of the bottom surface 211 of the bearing part 21. For this reason, the rotary unit can be inhibited from being rotated with the bottom surface 211 of the bearing part 21 protruding to a radially outer side from the top surface 223 of the spacer 22. As a result, the rotational sliding of the vibration motor 1 can be stabilized.

As described above, the entire inner circumferential edge 143 of the top surface 142 of each coil 141 is disposed at a radially outer side than the outer edge 222 of the bottom surface 221 of the spacer 22. Also, a part of the outer circumference 144 of the top surface 142 of each coil 141 is disposed at a radially inner side than the outer edge 222 of the bottom surface 221 of the spacer 22. Accordingly, the spacer 22 can be radially minimized.

Figure 7:
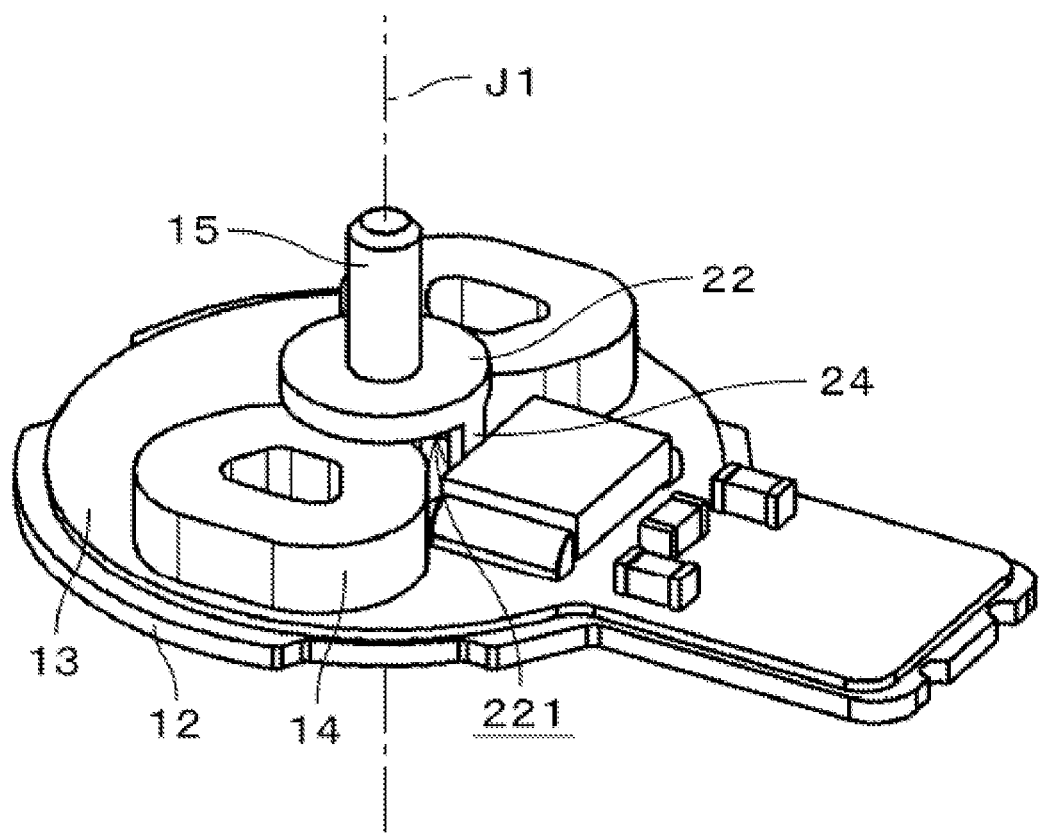
FIG. 7 is a perspective view of the stationary unit.
Figure 8:
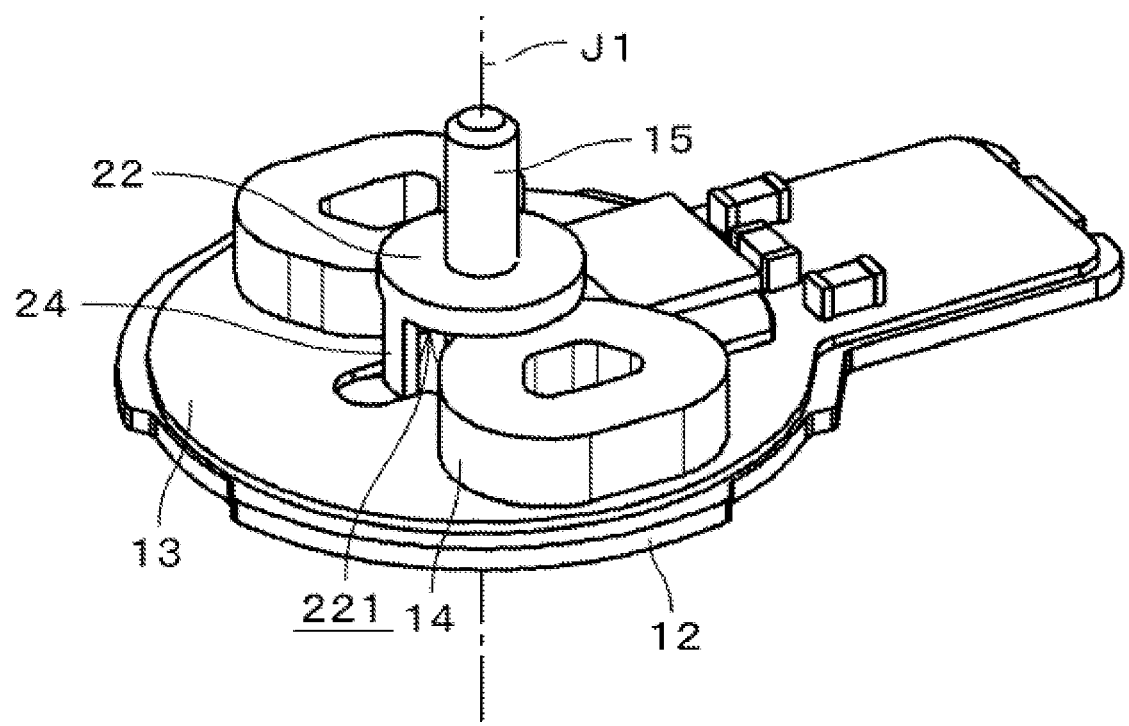
FIG. 8 is a perspective view of the stationary unit.
Figure 9:
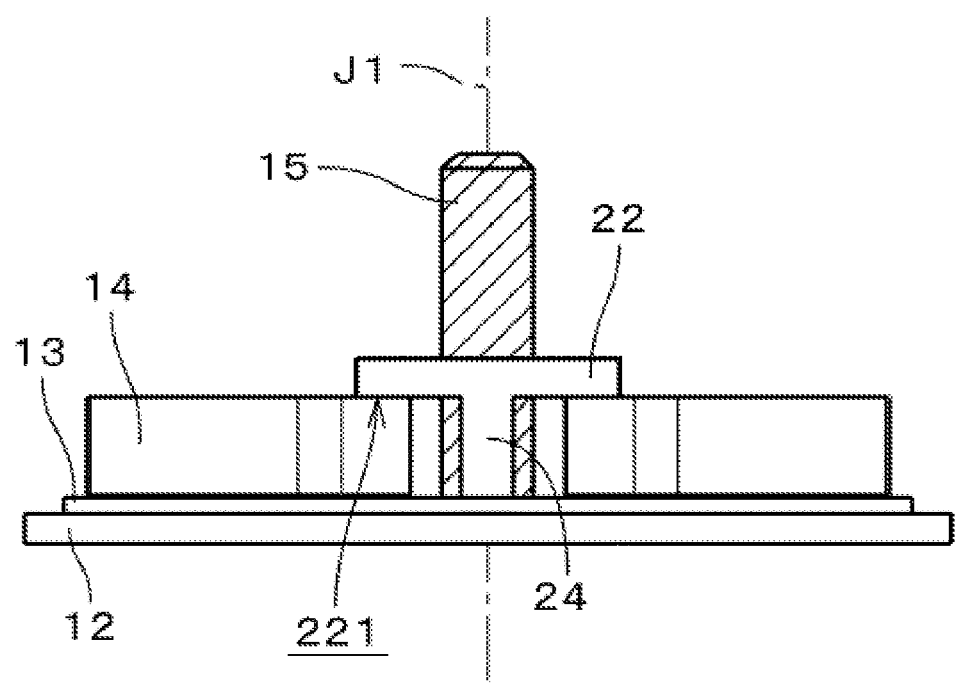
FIG. 9 is a side view of the stationary unit.

As shown in FIG. 7 to FIG. 9, the vibration motor 1 may include a spacer support 24 which protrudes downward from the bottom surface 221 of the spacer 22. FIG. 7 and FIG. 8 are perspective views of the stationary unit of the vibration motor 1, each viewed from a different direction. FIG. 9 is a side view of the stationary unit. FIG. 9 illustrates the stationary unit viewed from the same direction as FIG. 6. In FIG. 9, a parallel diagonal line is added to the shaft 15 for easier understanding of the figure.

In the example shown in FIG. 7 to FIG. 9, two spacer supports 24 extend from the bottom surface 221 of the spacer 22 substantially parallel to the shaft 15. There may be only one spacer support 24, or may be three or more. The lower end of each spacer support 24 is in contact with the circuit board 13 or the base part 12. In the example shown in FIG. 8, each spacer support 24 is in contact with the base part 12 through a through hole provided to the circuit board 13.

By providing the spacer support 24, the force or shock applied to the coil part 14 through the rotary unit when the vibration motor 1 falls or in other situations, can be reduced. As a result, the coil part 14 can be inhibited from being damaged when the vibration motor 1 falls or in other situations.

Figure 10:
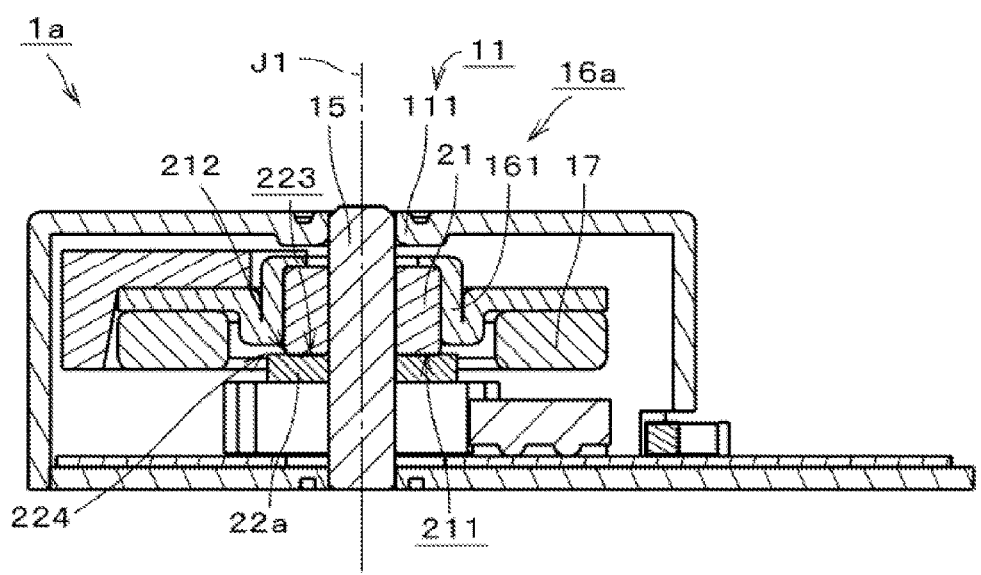
FIG. 10 is a vertical cross-sectional view of a vibration motor according to a second preferred embodiment.
Figure 1:
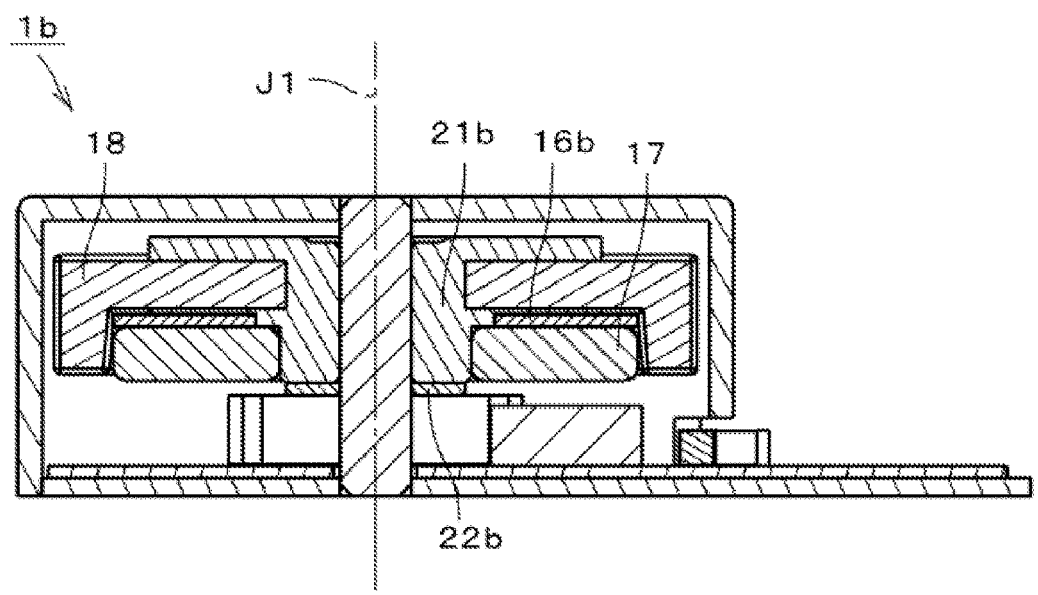
Figure 1:
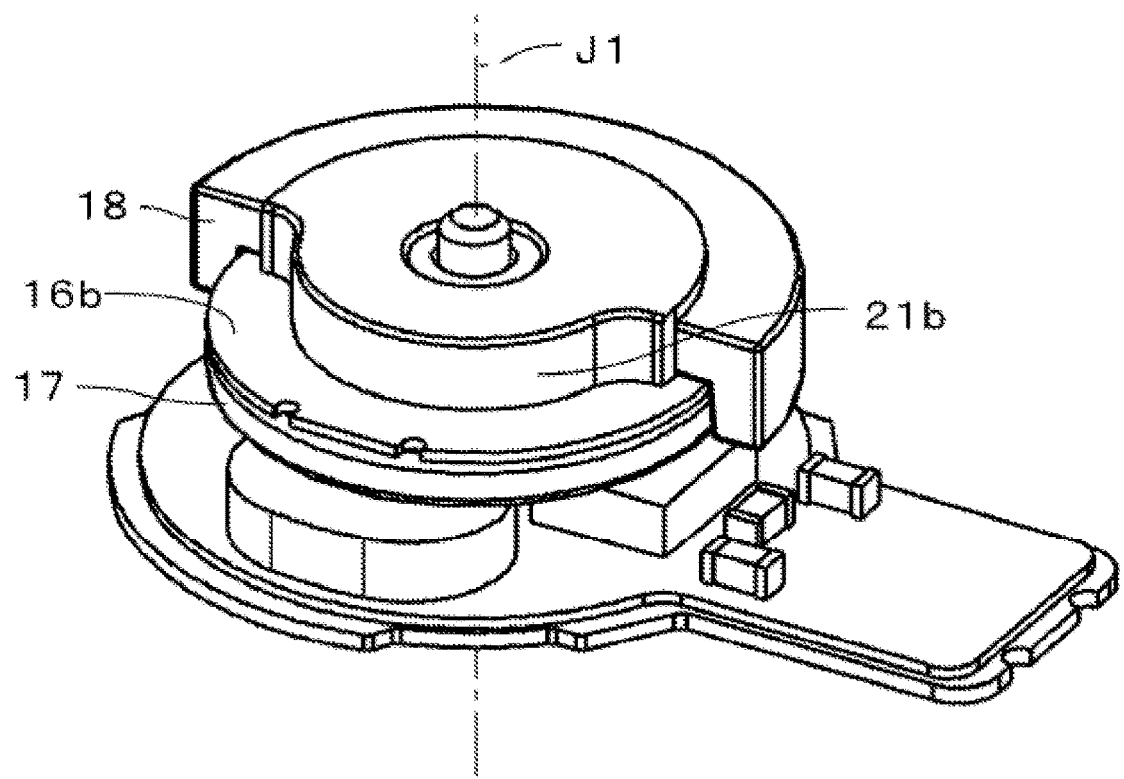

FIG. 10 is a vertical cross-sectional view of a vibration motor 1a according to a second exemplary preferred embodiment of the present disclosure. The vibration motor 1a includes a rotor holder 16a and a spacer 22a, which have different shapes from the rotor holder 16 and the spacer 22 of the vibration motor 1 shown in FIG. 2. The rest of the constitutions of the vibration motor 1a are identical to the constitutions of the vibration motor 1 shown in FIG. 1 to FIG. 6, and therefore the corresponding features are designated with identical reference numbers.

The rotor holder 16a can be attached to the bearing part 21. Specifically, an inner circumferential portion 61 of the rotor holder 16a can be attached to the top surface and the outer circumferential surface of the bearing part 21. The inner circumferential portion 161 of the rotor holder 16a is fixed to over the substantially entire outer circumferential surface of the bearing part 21. Accordingly, the rotor holder 16a can be securely fixed to the bearing part 21. The rotor holder 16a is bent to radially outer and upper sides from the lower end portion of the inner circumferential portion 161 and further bent to the radially outer side and extends to the radially outer side.

The spacer 22a is disposed at a radially inner side of the magnet part 17. The spacer 22a has an annular shape having its center on the center axis J1. The outer edge 224 of the top surface 223 of the spacer 22a is disposed in its entire circumference at a radially outer side than the outer edge 212 of the bottom surface 211 of the bearing part 21. That is, the outer diameter of the top surface 223 of the spacer 22a is bigger than the outer diameter of the bottom surface 211 of the bearing part 21. For this reason, when the rotary unit rotates, the bottom surface 211 of the bearing part 21 can be inhibited from protruding away to a radially outer side from the top surface 223 of the spacer 22a. As a result, the rotational sliding of the vibration motor 1a can be stabilized.

In the vibration motor 1a, a cover protrusion 111 is provided on the lid portion of the cover part 11 at the junction with the shaft 15. The cover protrusion 111 protrudes downward along the shaft 15. Accordingly, a long coupling length is formed between the cover part 11 and the shaft 15. As a result, the cover part 11 can be more securely fixed to the shaft 15.

FIG. 11 is a vertical cross-sectional view of a vibration motor 1b according to a third exemplary preferred embodiment of the present disclosure. FIG. 12 is a perspective view of a rotary unit and a stationary unit of the vibration motor 1b. In FIG. 11 and FIG. 12, the direction of an eccentric weight 18 is different from that shown in FIG. 2 and FIG. 3 by 90 degrees. The vibration motor 1b includes a rotor holder 16b, a bearing part 21b and a spacer 22b, which have different shapes from the rotor holder 16, the bearing part 21 and the spacer 22 of the vibration motor 1 shown in FIG. 2. The rest of the constitutions of the vibration motor 1b are identical to the constitutions of the vibration motor 1 shown in FIG. 1 to FIG. 6, and therefore the corresponding features are designated with identical reference numbers.

The spacer 22b is disposed at a lower side than the magnet part 17. The spacer 22b has an annular shape. Specifically, the spacer 22b has an annular disc shape having its center on the center axis J1. The rotor holder 16b has a substantially annular disc shape having its center on the center axis J1. The bearing 21b is made of, for example, resin, and is integrally formed into a single unit with the rotor holder 16b and the eccentric weight 18 by insert molding. Since most of the rotary unit is thus formed by insert molding, the number of components constituting the vibration motor 1b can be reduced. As a result, the assembly of the vibration motor 1b can be simplified.

Figure 13:
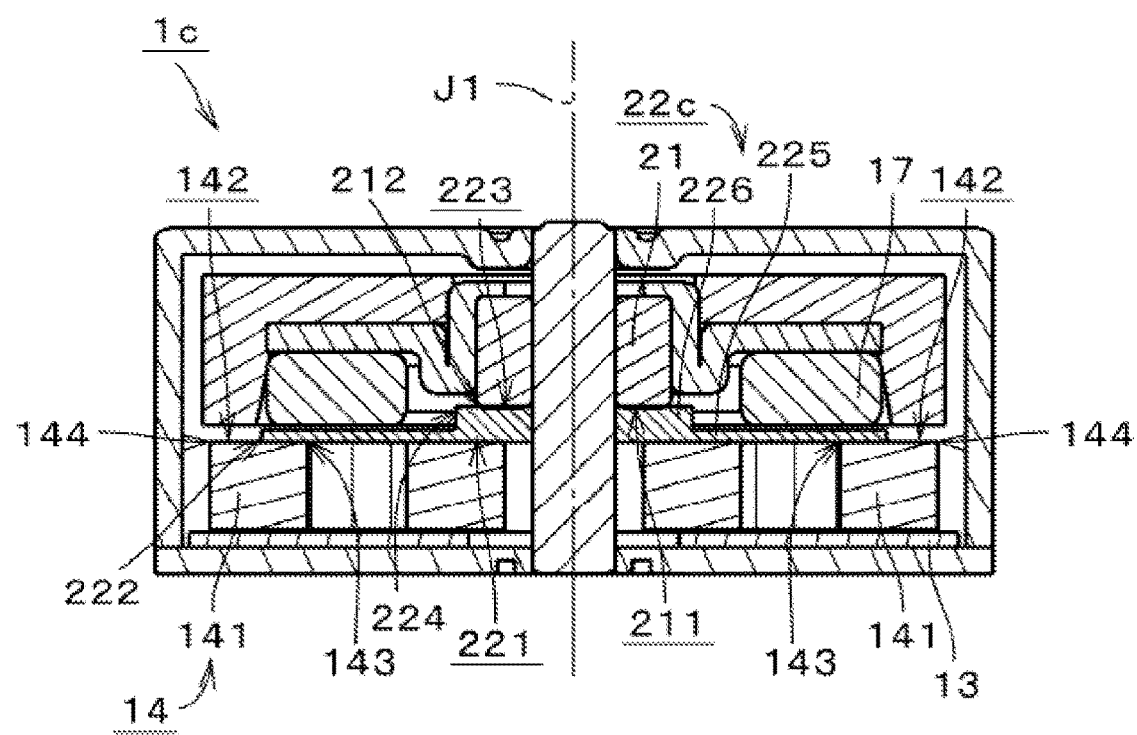
FIG. 13 is a vertical cross-sectional view of a vibration motor according to a fourth preferred embodiment.
Figure 14:
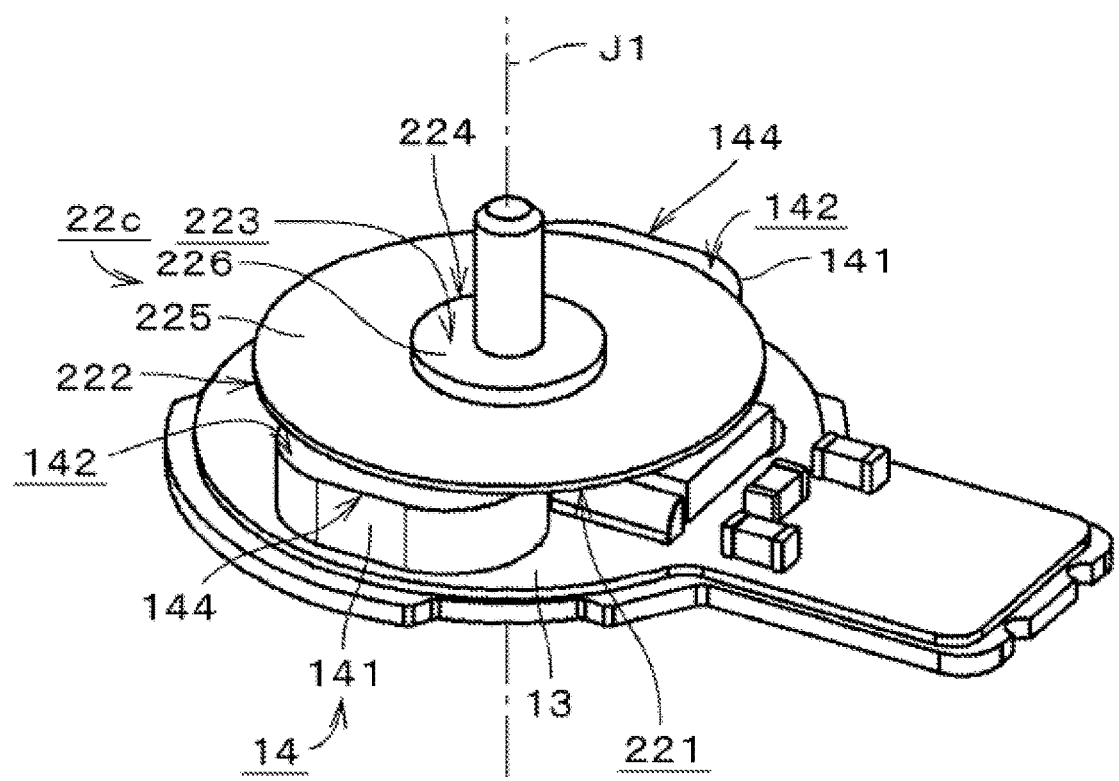
FIG. 14 is a perspective view of the stationary unit.

FIG. 13 is a vertical cross-sectional view of a vibration motor 1c according to a fourth exemplary preferred embodiment of the present disclosure. FIG. 14 is a perspective view of a stationary unit of the vibration motor 1c. FIG. 13 shows a cross section which is different from that shown in FIG. 10 by 90 degrees. The vibration motor 1c includes a spacer 22c which has a different shape from the spacer 22a of the vibration motor 1a shown in FIG. 10. The rest of the constitutions of the vibration motor 1c are identical to the constitutions of the vibration motor 1a shown in FIG. 10, and therefore the corresponding features are designated with identical reference numbers.

The spacer 22c has an annular shape having its center on the center axis J1. The spacer 22c includes a lower spacer 225 having an annular disc shape, and an upper spacer 226 having an annular disc shape which protrudes upward from an inner circumferential portion of the lower spacer 225. The outer diameter of the lower spacer 225 is bigger than the outer diameter of the upper spacer 226. The top surface of the upper spacer 226 is the top surface 223 of the spacer 22c, and the bottom surface of the lower spacer 225 is the bottom surface 221 of the spacer 22c. The upper spacer 226 is disposed at a radially inner side of the magnet part 17.

The outer edge 224 of the top surface 223 of the spacer 22c is disposed in its entire circumference at a radially outer side than the outer edge 212 of the bottom surface 211 of the bearing part 21. For this reason, when the rotary part rotates, the bottom surface 211 of the bearing part 21 can be inhibited from protruding away to a radially outer side from the top surface 223 of the spacer 22c. As a result, the rotational sliding of the vibration motor 1c can be stabilized.

The entire inner circumferential edge 143 of the top surface 142 of each coil 141 is disposed at a radially inner side than the outer edge 222 of the bottom surface 221 of the spacer 22c. Also, a portion of the outer circumference 144 of the top surface 142 of each coil 141 is disposed at a radially outer side than the outer edge 222 of the bottom surface 221 of the spacer 22c. That is, the bottom surface 221 of the spacer 22c overlaps with the entire opening provided at the center portion of the top surface 142 of each coil 141 of the coil part 14.

Accordingly, the coil part 14 can be further inhibited from being peeled off from the circuit board 13 by limiting the vertical movement of the coil part 14 when the vibration motor 1c falls or in other situations. Further, since the vertical location of the top surface 142 of the coil part 14 can be inhibited from being unevenly arranged, the vertical distance between the coil part 14 and the magnet part 17 can be more easily secured.

Figure 15:
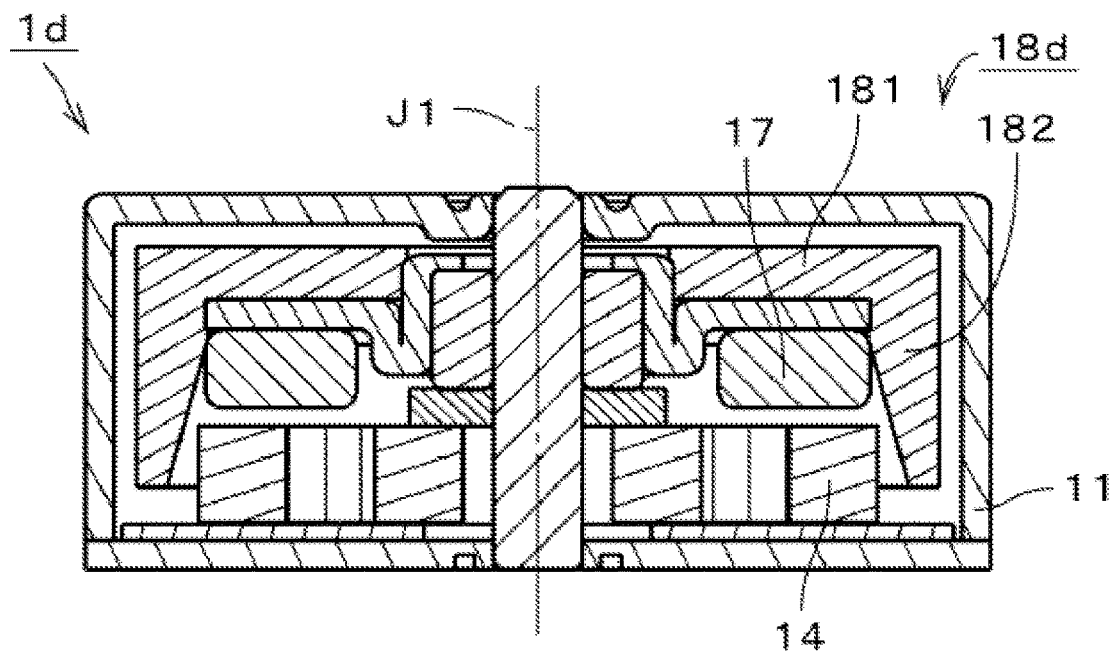
FIG. 15 is a vertical cross-sectional view of a vibration motor according to a fifth preferred embodiment.

FIG. 15 is a vertical cross-sectional view of a vibration motor 1d according to a fifth exemplary preferred embodiment of the present disclosure. FIG. 15 shows a cross-section which is different from that shown in FIG. 10 by 90 degrees. The vibration motor 1d includes an eccentric weight 18d which has a different shape from the eccentric weight 18 of the vibration motor 1a shown in FIG. 10. The rest of the constitutions of the vibration motor 1d are identical to the constitutions of the vibration motor 1a shown in FIG. 10, and therefore the corresponding features are designated with identical reference numbers.

The eccentric weight 18d has substantially the same shape as the eccentric weight 18 shown in FIG. 10, except that the lower end of the side wall portion 182 is disposed at a more downward side than the lower end of the magnet part 17. In this vibration motor 1d, the lower end portion of the side wall portion 182, which is a portion of the eccentric weight 18d, is disposed between the coil part 14 and the cover part 11 at a radially outer side than the coil part 14. Consequently, it is possible to enlarge the eccentric weight 18d while inhibiting the vibration motor 1d from becoming enlarged, and at the same time, increase the amount of vibration of the vibration motor 1d.

It is possible to make a variety of modifications to the vibration motor 1, 1a~1d.

For example, in the vibration motor 1, 1a~1d, the lid part 181 of the eccentric weight 18, 18d can be omitted, and the eccentric weight 18, 18d can be provided only to a radially outer side of the magnet part 17.

Figure 16:
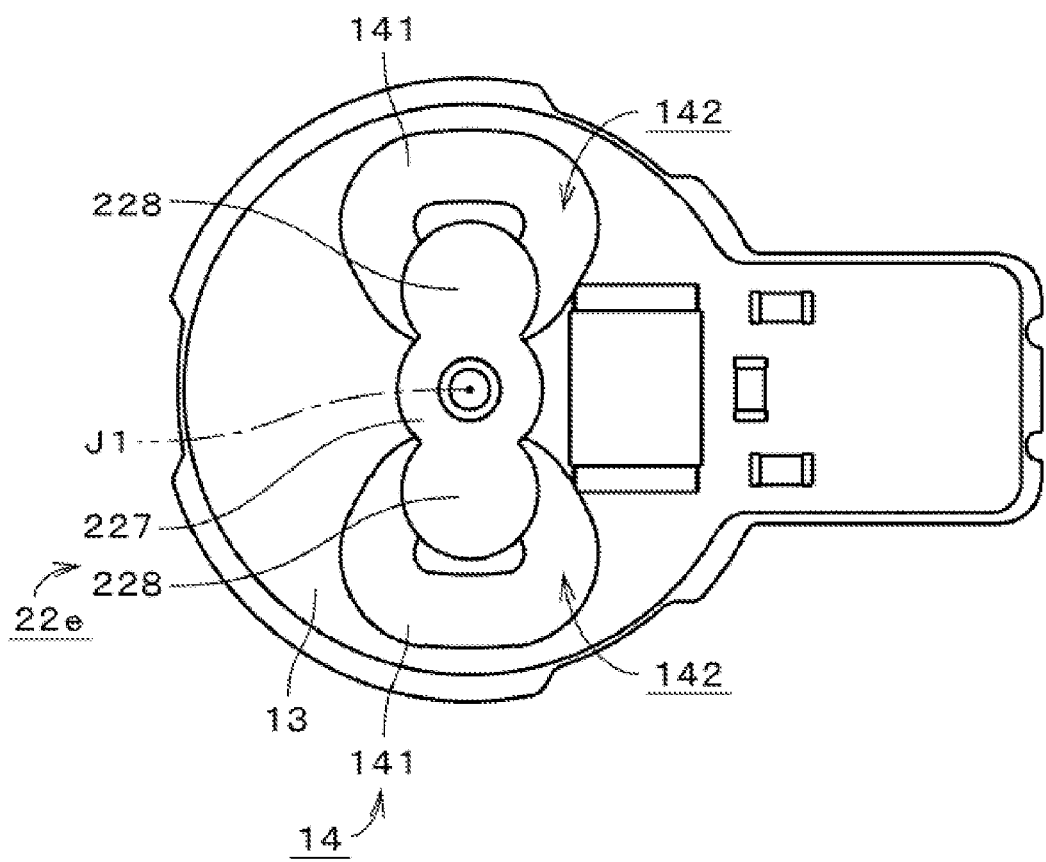
FIG. 16 is a top view of the stationary unit which presents another form of a spacer.

The bottom surface 221 of the spacer 22, 22a~22c does not necessarily need to be in contact with the top surface 142 of the coil part 14, and it may be spaced apart from the top surface 142, as long as it vertically faces the top surface 142 of the coil part 14. The spacer 22, 22a~22c does not necessarily need to have an annular shape. For example, the spacer 22e shown in FIG. 16 includes a center portion 227 which has a substantially annular shape, and two peripheral portions 228 which expand from the outer circumferential portion of the center portion 227 over the two coils 141. Since the peripheral portion 228 vertically faces the top surface 142 of the coil 141, the coil part 14 can be inhibited from being peeled off from the circuit board 13 when the vibration motor falls or in other situations. Also, the vertical distance between the coil part 14 and the magnet part 17 can be easily secured.

The installation or fixation of each member in the vibration motor 1, 1a~1d may be indirect. For example, another member may be inserted between the circuit board 13 and the base part 12, as long as the circuit board 13 is disposed on the base part 12. The coil part 14 may also be attached to the circuit board 13 via another member. The attachments of the shaft 15 to the cover part 11 and the base part 12; the magnet part 17 to the rotor holder 16, 16a, 16b; the eccentric weight 18, 18d to the rotor holder 16, 16a, 16b; and the fixation of the cover part 11 and the base part 12, etc. may be made by inserting another member therebetween.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor, comprising:
   a base part which expands perpendicular to a vertical center axis;
   a shaft which protrudes upward along the center axis, a lower end of the shaft being fixed to the base part;
   a circuit board disposed on the base part;
   coil parts which are attached onto the circuit board, and face each other in a radial direction across the shaft and a gap;
   a bearing part which is rotatably attached to the shaft at an upper side than the coil part;
   a rotor holder which is attached to the bearing part;
   a magnet part which is attached to the rotor holder;
   an eccentric weight which is attached to the rotor holder;
   a spacer which is attached to the shaft at a portion between the bearing part and the coil part, a top surface of the spacer being in contact with a bottom surface of the bearing part; and
   a cover part which covers at least a portion of the upper and lateral sides of the rotor holder and the eccentric weight, and is fixed to an upper end portion of the shaft and an edge portion of the base part,
   wherein a bottom surface of the spacer faces a top surface of the coil part in a vertical direction.

2. The vibration motor according to claim 1,
   wherein the bottom surface of the spacer is in contact with the top surface of the coil part.

3. The vibration motor according to claim 2,
   wherein the spacer is disposed at a radially inner side of the magnet part.

4. The vibration motor according to claim 2,
   wherein the spacer is attached to the shaft by press-fitting.

5. The vibration motor of claim 4,
   further comprising a spacer support which protrudes downward from the bottom surface of the spacer, and is in contact with the circuit board or the base part.

6. The vibration motor according to claim 4,
   wherein an outer edge of the top surface of the spacer overlaps with an outer edge of the bottom surface of the bearing part over the entire circumference, or is disposed at a radially outer side than the outer edge of the bottom surface of the bearing part.

7. The vibration motor of claim 6,
   wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially outer side than the outer edge of the bottom surface of the spacer; and a portion of the outer circumference of the top surface of each coil is disposed at a radially inner side than the outer edge of the spacer.

8. The vibration motor of claim 6,
   wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially inner side than the outer edge of the bottom surface of the spacer; and a portion of the outer circumference of the top surface of each coil is disposed at a radially outer side than the outer edge of the spacer.

9. The vibration motor of claim 6,
   wherein the spacer has an annular shape.

10. The vibration motor of claim 6,
    wherein a portion of the eccentric weight is disposed between the coil part and the cover part at a radially outer side than the coil part.

11. The vibration motor of claim 4,
    wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially outer side than the outer edge of the bottom surface of the spacer; and a portion of the outer circumference of the top surface of each coil is disposed at a radially inner side than the outer edge of the spacer.

12. The vibration motor of claim 4,
    wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially inner side than the outer edge of the bottom surface of the spacer; and a portion of the outer circumference of the top surface of each coil is disposed at a radially outer side than the outer edge of the spacer.

13. The vibration motor according to claim 2,
wherein an outer edge of the top surface of the spacer overlaps with an outer edge of the bottom surface of the bearing part over the entire circumference, or is disposed at a radially outer side than the outer edge of the bottom surface of the bearing part.

14. The vibration motor of claim 2,
wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially outer side than the outer edge of the bottom surface of the spacer; and a portion of the outer circumference of the top surface of each coil is disposed at a radially inner side than the outer edge of the spacer.

15. The vibration motor of claim 2,
wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially inner side than the outer edge of the bottom surface of the spacer; and a portion of the outer circumference of the top surface of each coil is disposed at a radially outer side than the outer edge of the spacer.

16. The vibration motor according to claim 1,
wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially outer side than the outer edge of the bottom surface of the spacer; and a portion of the outer circumference of the top surface of each coil is disposed at a radially inner side than the outer edge of the spacer.

17. The vibration motor of claim 1,
wherein the coil part includes a plurality of coils which are disposed around the shaft, and when viewed in a top view, each coil surrounds an axis parallel to the shaft, and has a ring shape with the shaft disposed at an outer side; the entire inner circumferential edge of the top surface of each coil is disposed at a radially inner side than the outer edge of the bottom surface of the spacer; and a portion of the outer circumference of the top surface of each coil is disposed at a radially outer side than the outer edge of the spacer.

\* \* \* \* \*